United States Patent [19]
Nagao

[11] Patent Number: 5,768,020
[45] Date of Patent: Jun. 16, 1998

[54] AUTOMATIC ANTI-GLARE REARVIEW MIRROR SYSTEM

[75] Inventor: Mitsuyoshi Nagao, Yaizu, Japan

[73] Assignee: Murakami Kaimeido Co., Ltd., Shizuoka-ken, Japan

[21] Appl. No.: 551,859

[22] Filed: Nov. 7, 1995

[30] Foreign Application Priority Data

Nov. 9, 1994 [JP] Japan .................. 6-299087

[51] Int. Cl.$^6$ .............................. G02B 5/08
[52] U.S. Cl. .............................. 359/604
[58] Field of Search ............... 359/603, 604, 359/843, 839

[56] References Cited

U.S. PATENT DOCUMENTS

| | | | |
|---|---|---|---|
| 4,793,690 | 12/1988 | Gahan et al. | 350/279 |
| 4,820,933 | 4/1989 | Hong et al. | 307/10.1 |
| 4,917,477 | 4/1990 | Bechtel et al. | 350/357 |
| 5,064,274 | 11/1991 | Alten | 359/604 |
| 5,204,778 | 4/1993 | Bechtel | 359/604 |
| 5,469,296 | 11/1995 | Ohno et al. | 359/603 |
| 5,550,677 | 8/1996 | Schofield et al. | 359/604 |
| 5,581,406 | 12/1996 | Kobayashi et al. | 359/604 |

*Primary Examiner*—Mark R. Powell
*Attorney, Agent, or Firm*—Michael J. Striker

[57] ABSTRACT

An automatic anti-glare rearview mirror system includes an anti-glare rearview mirror, a rearview mirror drive circuit, a backward light level sensing device, an ambient light level sensing device, a backward and ambient light level comparison circuit, and an enforced DAY level control device for an enforced DAY level setting device for controlling an anti-glare mode of the mirror according to the ambient light level. The enforced DAY level control device varies the ambient light level to operated an enforced DAY generation circuit by informations from a clock circuit other than a photo-sensor, any time operable switches and variable controller or a light switch ON of an automobile of itself. The high accurate automatic anti-glare mode which has not been taught by conventional prior arts is achieved to be adequate for an actual using condition so as to overcome the disadvantage that the rearview mirror becomes the anti-glare mode at the gray place such as a tree shade in a day time and the backward being not bright, to the contrary, to enable the rearview mirror to become the anti-glare mode adequately at a comparative bright place such as a shopping arcade in a night time.

11 Claims, 15 Drawing Sheets

R21 : 550kΩ
R22 : 160kΩ
R23 : 50kΩ
R24 : 5.6MΩ

DIAGRAM 4

VR4: 0~500kΩ
R41: 50kΩ
R42: 5.6MΩ

DIAGRAM 6

AUTOMATIC ANTI-GLARE REARVIEW MIRROR SYSTEM

BACKGROUND OF THE INVENTION

1. Field of the Invention

The present invention relates to an automatic anti-glare to an anti-glare rearview mirror system capable of varying an ambient light level to operate an enforced DAY generation circuit by an information other than an photo-sensor.

2. description of the Relevant Art

It is known that the rearview mirror of the automobile is of the automobile so that the driver can obtain the backward sight during the automobile running. During night driving, due to a bright reflection of the rearview mirror caused by the backward automobile head light and by a street light, it is impossible to prevent the driver's eyes from a glare light under the same optical characteristic as in a day time, and the driver feels a glare light and can not see forward of the automobile. Therefore instead of the two positions prism mirror type anti-glare rearview mirror for varying the reflecting angle, the automatic anti-glare rearview mirror is used for detecting the illuminance of the backward light and the ambient light to vary the reflectivity automatically in order to provide in the rearview mirror the low reflectivity in the an anti-glare mode or the high reflectivity in the normal mode in case of necessity.

Recently, it has been proposed to use various anti-glare rearview mirrors with the electronic structure of controlling the reflection light level having a certain mirror attaching angle. In those electronic controlled anti-glare rearview mirrors, there have been mirror which use the liquid crystal layer or an electrochromic device (ECD). For example, U.S. Pat. No. 4,902,108 discloses an advanced control for EC mirror using ECD and a mechanical anti-glare rearview mirror or the liquid crystal type anti-glare rearview mirror.

In the EC mirror, a sealed chamber is formed by a transparent front glass, an edge seal and a reflecting layer and is filled with a substance having a determined EC characteristic (EC layer). A transparent conductive layer (electrode) is provided on both top and rear surface of EC layer and a determined control signal (voltage) is applied thereon from an electronic circuit.

The response speed of ECD is relatively slow compared to the human eyes characteristic, and is available for the automatic anti-glare rearview mirror. In respect to a drive circuit and a backward light and ambient light comparative circuit, detailed descriptions are respectively disclosed by U.S. Pat. No. 4,902,108 and Japanese Patent Application No. Hei 6-99291, and an example of the normal construction thereof is shown in FIG. 14. In FIG. 14, a value detected by an ambient light level sensor 10 and a backward light level sensor 11 is compared by a backward and ambient light level comparison circuit 12 to supply an output, said output and an output of an enforced DAY circuit 13 are applied to a gate circuit 14, and EC mirror 20 is actuated via an anti-glare rearview mirror drive circuit 15 by the output of the gate circuit 14. The drive circuit 15 branches the output of the gate circuit 14 to connect inverters INV 1 and INV 2 in parallel with each other and further to connect inverters INV 2 and INV 3 in series, transistors Q1, Q2 are connected in parallel with forward and backward of the inverter INV 1 respectively, while transistors Q3, Q4 are connected in parallel with forward and backward of the inverter INV 3 respectively, and EC mirror 20 is provide with positive and negative voltages in accordance with the output, of the gate circuit 14.

As described above, in principle the automatic anti-glare rearview mirror operates in an anti-glare mode by reflecting a glare light of the backward automobile during night time. Normally the ambient light level (illuminance) and the backward light level (illuminance) are compared with each other, and said anti-glare mode is performed. The backward light level sensor and the ambient light level sensor are used for detecting the light level with a CdS(Cadmium Sulfide) device normally used. FIG. 15 shows a characteristic diagram of a relation of an illuminance and a resistance value of a popular CdS device. In each embodiment of the present invention which will be described hereinafter, CdS device is used for respective sensors as described above.

A diagram 7 of FIG. 16 indicates a characteristic of an anti-glare mode (mirror sensitive characteristic) of the popular automatic rearview mirror to show a relation of the ambient light illuminance (light level) and the backward light illuminance (light level). Normally, a range of the anti-glare mode is set in upper side (oblique line) of a line B of the diagram 7 and the rearview mirror operates in the anti-glare mode in principle by a combination of the ambient light illuminance and the backward light illuminance within the oblique line range. The EC rearview mirror can have an intermediate reflectivity, the anti-glare degree (varying mode of the rearview mirror reflectivity) becomes continual depending on the drive circuit.

When the backward sight is bright in the day time, for example the automobile is running the mountain bottom facing toward the mountain side and the mirror reflects the backward very bright sun shine, it is not necessary for the mirror to operate in the anti-glare mode, however depending only on the function described hereinbefore, there is a fear that the rearview mirror operates in the anti-glare mode.

To overcome above described useless anti-glare mode of the mirror in use, it is popular to form the automatic anti-glare rearview mirror so that it is enforced in normal mode (hereinafter referred to as "Enforced DAY function") when the ambient light illuminance (brightness) is over a certain level (normally several tens lux). As shown by the diagram 7 of FIG. 16, an enforced DAY function is provided and the mirror is prevented from operating in the anti-glare mode to reflect the ambient illuminance (brightness) over a certain level (a right side of line D). The anti-glare mode is shown within the oblique line crossing part of the diagram 7.

This enforced DAY function is also adapted in EC mirror. For example, Japanese Patent Application No. Hei 6-99291 filed by the applicant of the present invention, discloses an electronic circuit for controlling a reflectivity variable characteristic of ECD to perform the anti-glare operation and includes the enforced DAY function not only to control the reflectivity variable level of EC mirror but also to control the anti-glare mode of the mirror depending on the ambient light level so as to inhibit the useless anti-glare mode. The same circuit diagram as described in the Japanese Patent Application No. Hei 6-99291 is shown by FIG. 17. As shown by a mirror sensitivity characteristic in a diagram 8 of FIG. 18, a circuit constant is adjusted to saturate the diagram curve at a line D, and the same effect caused by the enforced DAY function is achieved. In the present invention, the example shown by FIG. 18 is also regarded as the enforced DAY function.

While an art technic to inhibit the reflectivity variable operation completely is known and is confused with the enforced DAY function, for example, in U.S. Pat. No. 4,902,108 as described hereinbefore, it is disclosed that the mirror is enforced to a normal mode in case of a backgear state (the automatic anti-glare control is prohibited enforcedly). However these technics take a different view from the enforced DAY function for controlling the anti-glare mode by reflecting the ambient light level.

There is still a disadvantage in the automatic anti-glare rearview mirror system having the enforced DAY function. For example, when it is a day time and the backward is not so glare, the rearview mirror is happened to be in the anti-glare mode and is colored at a place of the comparative gray ambient light such as a tree shade. Further, other disadvantage is caused in the automatic anti-glare rearview mirror by the enforced DAY function exactly, for example, in a night time and the backward is actually glare in the comparative bright ambient place such as a shopping arcade, however there is happened that the mirror is not colored. It is difficult to detect the coloring or the breaching of the mirror by an information from the light only since any light levels to be compared easily become the same level of several ten lux extent.

SUMMARY OF THE INVENTION

It is an object of the present invention to provide an automatic anti-glare rearview mirror system which overcomes disadvantages such as starting a useless anti-glare operation or performing no anti-glare actuation in necessity, and to achieve the high accurate anti-glare mode.

According to one of preferred embodiments of the present invention, an automatic anti-glare rearview mirror system comprises an EC anti-glare rearview mirror with reflectivity which is variable by an ECD, a EC drive circuit for operating the anti-glare mode of the anti-glare rearview mirror, drive power sources, an automobile backward light level sensing device, an automobile ambient light level sensing device, a backward and ambient light level comparison circuit for automatically operating the EC drive circuit under a certain mode based on an output of the backward and ambient light level sensing device, an enforced DAY generation circuit for controlling the anti-glare mode of the backward and ambient light level comparison circuit according to an ambient light level, and an enforced DAY level control means for changing an operation starting level of the enforced DAY generation circuit (13).

An automatic anti-glare rearview mirror further comprises an EC anti-glare rearview mirror with reflectivity which is variable by an ECD, a driving power source, an automobile backward light level sensing device; an automobile ambient light level sensing device, an enforced DAY generation circuit for operating an anti-glare mode of the rearview mirror according to the ambient light level, an enforced DAY level control means for changing an operation starting level of the enforced DAY generation circuit to a determined value, an oscillation device for repeating an oscillation signal of H level and L level alternately and capable of controlling duration times of H level and L level signal separately, a reverse cycle control circuit for varying and controlling a duration time of one of levels of the oscillation signal generated from the oscillation device according to the light level sensed by the ambient light level sensing device and for varying and controlling a duration time of the other of levels of the oscillation signal according to the light level sensed by the backward light level sensing device, and an ECD drive circuit for reversing a polarity of a driving voltage supplied from the driving power source and applying the voltage to the ECD according to the H or L level of the oscillation signal generated from the oscillation device.

The ECD in drive circuit is set to drive the ECD a coloring direction at one of oscillation signal levels and to drive it in a bleaching direction at the other level so that the reverse cycle control circuit operates to short hold or long hold the duration time of one of levels according to the greater ambient light level than the backward light level or according to the lesser ambient light level than the backward light level respectively said reverse cycle control circuit operates to short hold or long hold the duration time of the other level according to the greater backward light level than the ambient light level or according to the lesser backward light level than the ambient light level respectively, and said ECD in drive circuit is set to drive said ECD a beaching direction at one of oscillation signal levels and to drive it in a coloring direction at the other level so that the reverse cycle control circuit operates to long hold or short hold the duration time of one of levels according to the greater ambient light level than the backward light level or according to the lesser ambient light level than the backward light level respectively. Said reverse cycle control circuit operates to long hold or short hold the duration time of the other level according to the greater backward light level than the ambient light level or according to the lesser backward light level than the ambient light level respectively.

In the embodiment of the present invention, an anti-glare rearview mirror system is provided, wherein said reverse cycle control circuit includes first and second reverse cycle control circuits. Said first reverse cycle control circuit is provided with a first photoconductive cell with resistance value which is reduced according to the automobile ambient light level received therein, first resistor and first Diode connected in series with said first photoconductive cell and second resistor connected in parallel with said first photoconductive cell. Said second reverse cycle control circuit is provided with a second photoconductive cell with resistance value which is reduced according to the automobile ambient light level received therein, third resistor connected in series with said second photoconductive cell, second Diode in the reverse direction of said first Diode and forth resistor connected in parallel with said second photoconductive cell. Said oscillation device includes such a composition that said first and second reverse cycle control circuits are connected in parallel with each other on a feedback trace and a duration time of one of oscillation signal levels is shortened when resistance value of said first photoconductive cell becomes low, while a duration time of the other oscillation level is shortened when resistance value of said second photoconductive cell becomes low.

Said enforced DAY level control means is a clock circuit to change an operation starting level of said enforced DAY generation circuit to a determined value by an output on a certain date and/or during a certain time. Said enforced DAY level control means automatically varies an operation starting level of said enforced DAY generation circuit to a determined value by an output from an external equipment such as a light switch ON. Said enforced DAY level setting means includes a composition that an operation starting level of said enforced DAY generation circuit is set at any time by switches operated by the driver. Or said enforced DAY level setting means includes a composition that an operation starting level of said enforced DAY circuit can be continuously adjusted at any time by variable controllers operated by the driver.

According to the embodiment of the present invention, the enforced DAY level control means varies the operation starting level of said enforced DAY circuit on a date and/or during a time determined by the output of the clock circuit.

For example, during the night time depending on a season in a year, when the automobile is running through the ambient bright shopping arcade, the operation starting level of the enforced DAY function is made up by the backward automobile light so that the driver's eyes are protected from a glare light. While at the ambient dark place such as under the tree shade and the backward is bright during the day time, said level is made down to control the anti-glare mode of the mirror, and it is comfortable for the driver that the mirror is prevented from operating in the anti-glare mode.

Corresponding to the light switch ON the automobile of the enforced DAY level control means level up the operation level of the enforced DAY circuit. Therefore during the night time and when the automobile is running through the ambient bright shopping arcade, the driver's eyes are protected from the glare light by an adequate anti-glare mode caused by the backward automobile light. Further in the present invention, the driver can operate the enforced DAY level setting means, for example switches or variable controllers, to adjust the mode level of the enforced DAY circuit at any time by his decision to prevent the useless action (too sensitive anti-glare mode or stop action in case of necessity) which are described hereinbefore and the mirror mode can be set to the preferable characteristic individually. Further the mode can be set again depending on the change of the running environment easily.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

One of preferable embodiments of the present invention will be described in connection with the accompanying drawings.

Figure 1:
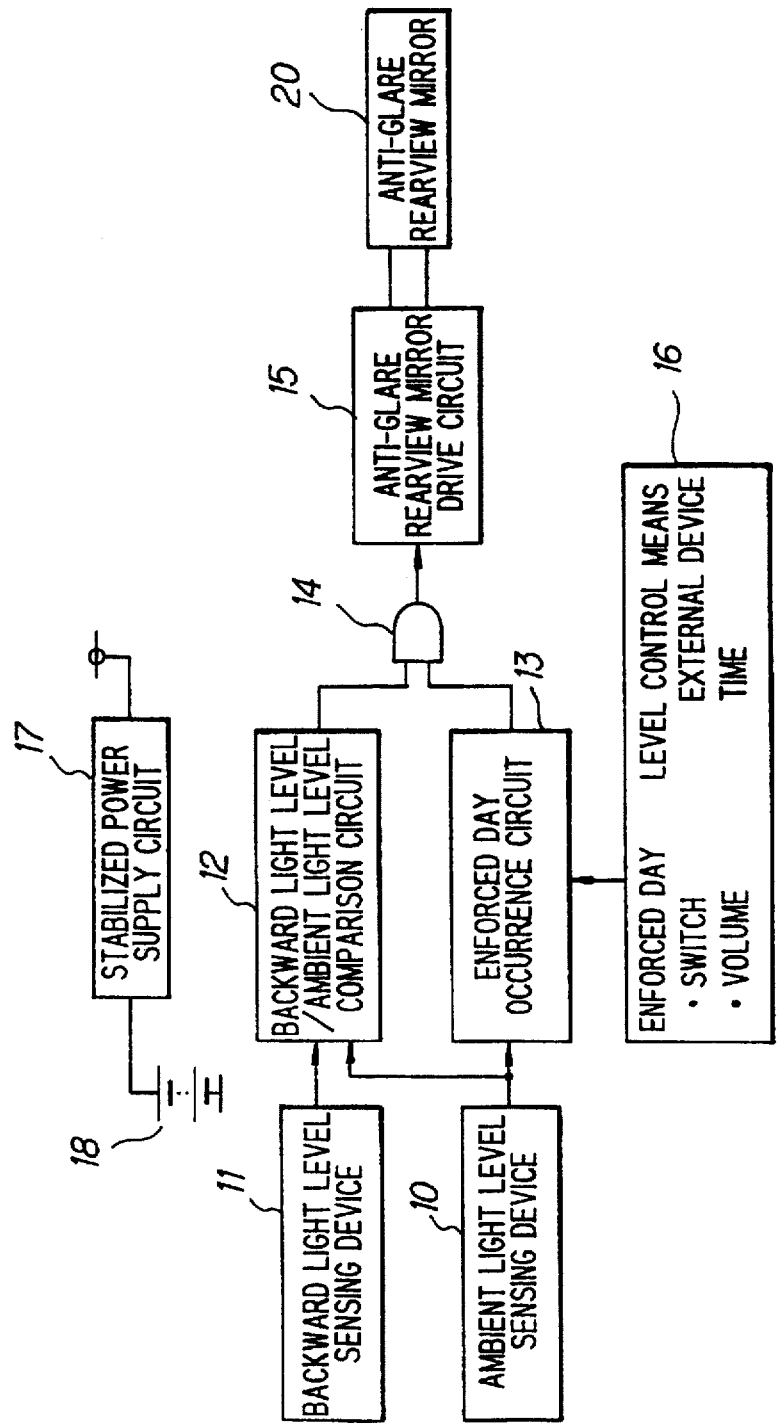
FIG. 1 is a diagram of operation of an anti-glare rearview mirror system according to the preferred embodiment of the present invention.
Figure 2:
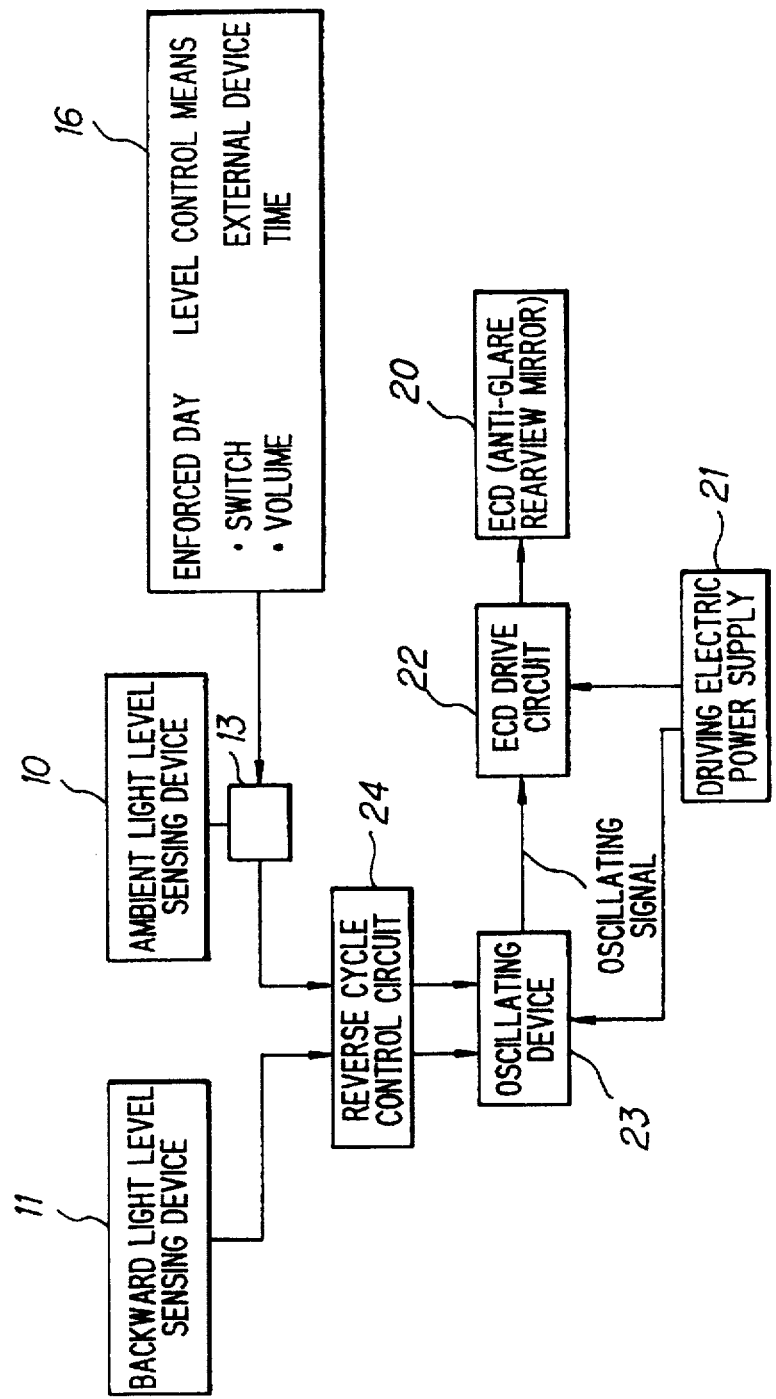
FIG. 2 is a diagram of an another modified embodiment according to the present invention.
Figure 10:
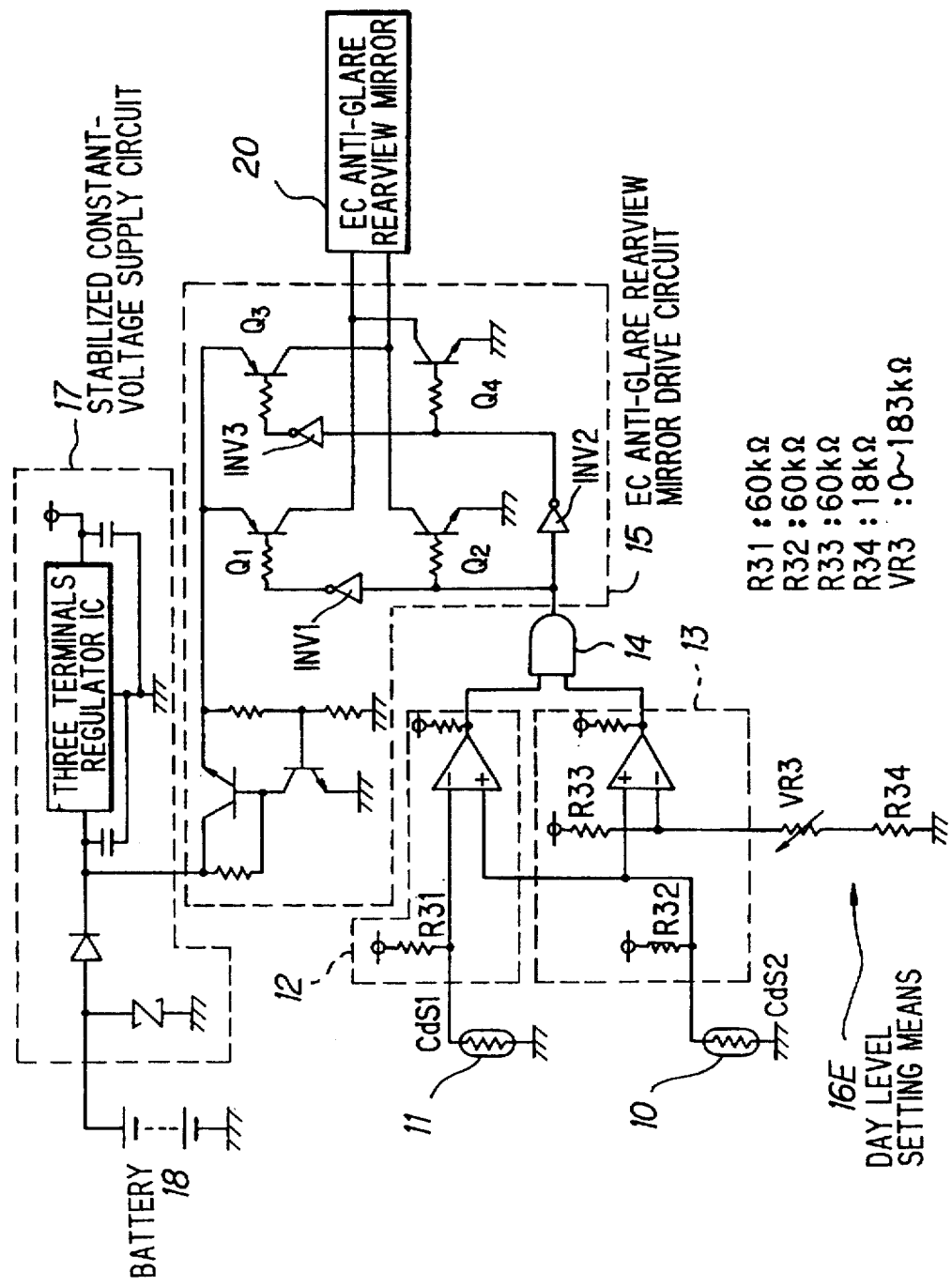
FIG. 10 is a partial circuit diagram of the other embodiment according to the present invention.

In the conventional anti-glare rearview mirror, the actuation of the enforced DAY function has been dependent on the information from the several ten lux ambient light level only and there has been disadvantages as described hereinbefore. In the present invention, the information other than the light level can be supplemented to reflect the rearview mirror according to the actual condition, in which an actuation level (threshold level) of the enforced DAY function is controlled to change by an enforced DAY level control means or an enforced DAY level setting means as described hereinbelow or the enforced DAY function of itself can be inhibited under an adequate condition as described hereinbelow to prevent the mirror from useless anti-glare mode or an out of order condition. FIG. 1 and FIG. 2 illustrate block diagrams of the embodiment of the present invention and FIG. 10 and FIG. 12A illustrate circuit diagrams of the system of the present invention.

In FIG. 1, the backward and the ambient light illuminance (bright level information)is obtained by a backward light level sensing device (11) (sensor) and an ambient light level sensing device (sensor)(10) and is compared and calculated by a backward and an ambient light level comparison circuit (12), and the result therefrom is inputted to one of an input terminal of AND circuit (14). In an enforced DAY generation circuit (13), the ambient brightness (voltage value) is compared and calculated with a level (standard voltage) according to a certain brightness of an actuation base and the result thereof is inputted to another input terminal of AND circuit (14). In an anti-glare rearview mirror drive circuit (15), a voltage and an electric current are supplied by a signal from AND circuit (14) to make the rearview mirror in an anti-glare mode or a normal mode. For example, "H" level is outputted for a direction of making the mirror an anti-glare mode, while "L" level is outputted for a direction of a normal mode.

An enforced DAY level control means (or an enforced DAY level setting means) indicated by a numeral (16) is connected to the enforced DAY generation circuit (13) to input an information other than the light level in order to change the ambient light level (actuation point) so as to operate the enforced DAY. For example "H" level is outputted when the mirror is enforced to be in an anti-glare mode and "L" level is outputted for a normal mode. As described hereinafter, for informations other than the light level, there are a clock circuit, a switch co-operating with an outer system, a switch or a volume for reflecting a driver's intention or the like.

A power source voltage from a battery (18) is constant and Supplied to IC or the like in circuits of each parts of the system by a stabilized constant voltage supply circuit (17).

Figure 17:
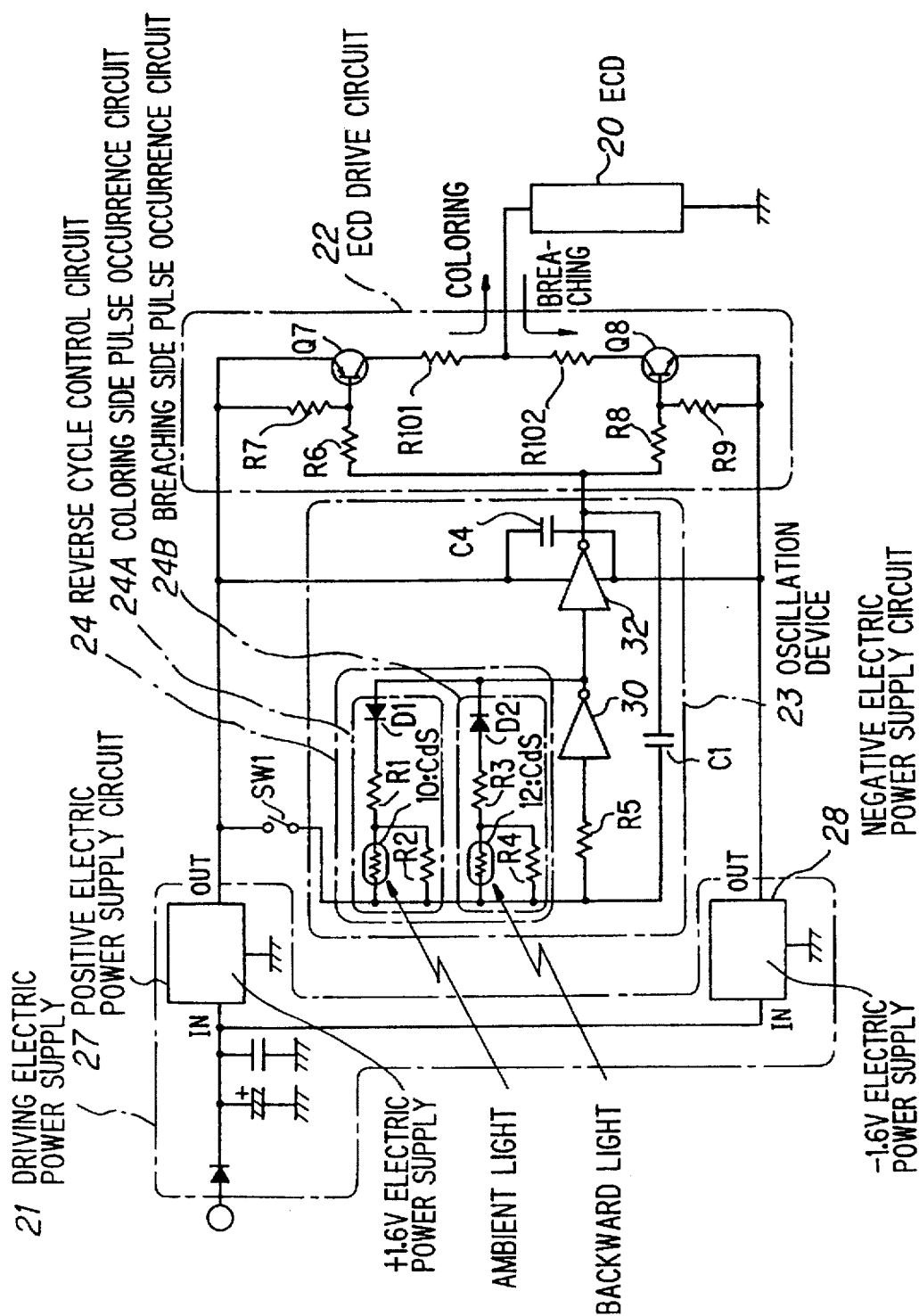
FIG. 17 is an electronic circuit diagram illustrating an other embodiment according to the conventional automatic anti-glare rearview mirror.
Figure 18:
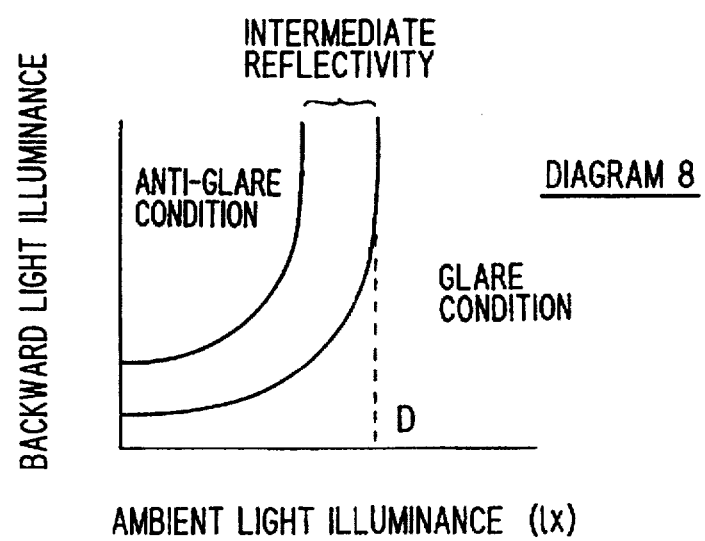
FIG. 18 is a diagram illustrating a sensitive characteristic of the rearview mirror which the circuit of FIG. 17 is used.

FIG. 2 illustrates a schematic diagram of an embodiment of the system of the present invention applied to a semicircuit disclosed by Japanese Patent Application No. Hei 6-99291 in FIG. 17. The enforced DAY level control means (enforced DAY level setting means) (15) is connected to the output of the ambient light level sensing device (10) to reflect (calculate and inhibit as a gate or the like, for example) the information other than the light level (the output from the clock circuit, the switch and the volume or the like) so as to change the ambient light level (actuation point) to operate the enforced DAY. The ambient light level of the enforced DAY can be changed by the structure described above, and the sustaining time ratio(duty ratio) of "H" or "L" level output from the reverse cycle control circuit (24) is changed. Further the backward light level sensing device (12), an oscillation device (23), EC device drive circuit (22), EC device (20A: anti-glare rearview mirror) and the driving power source (21) are constructed entirely the same as in FIG. 17.

Figure 3:
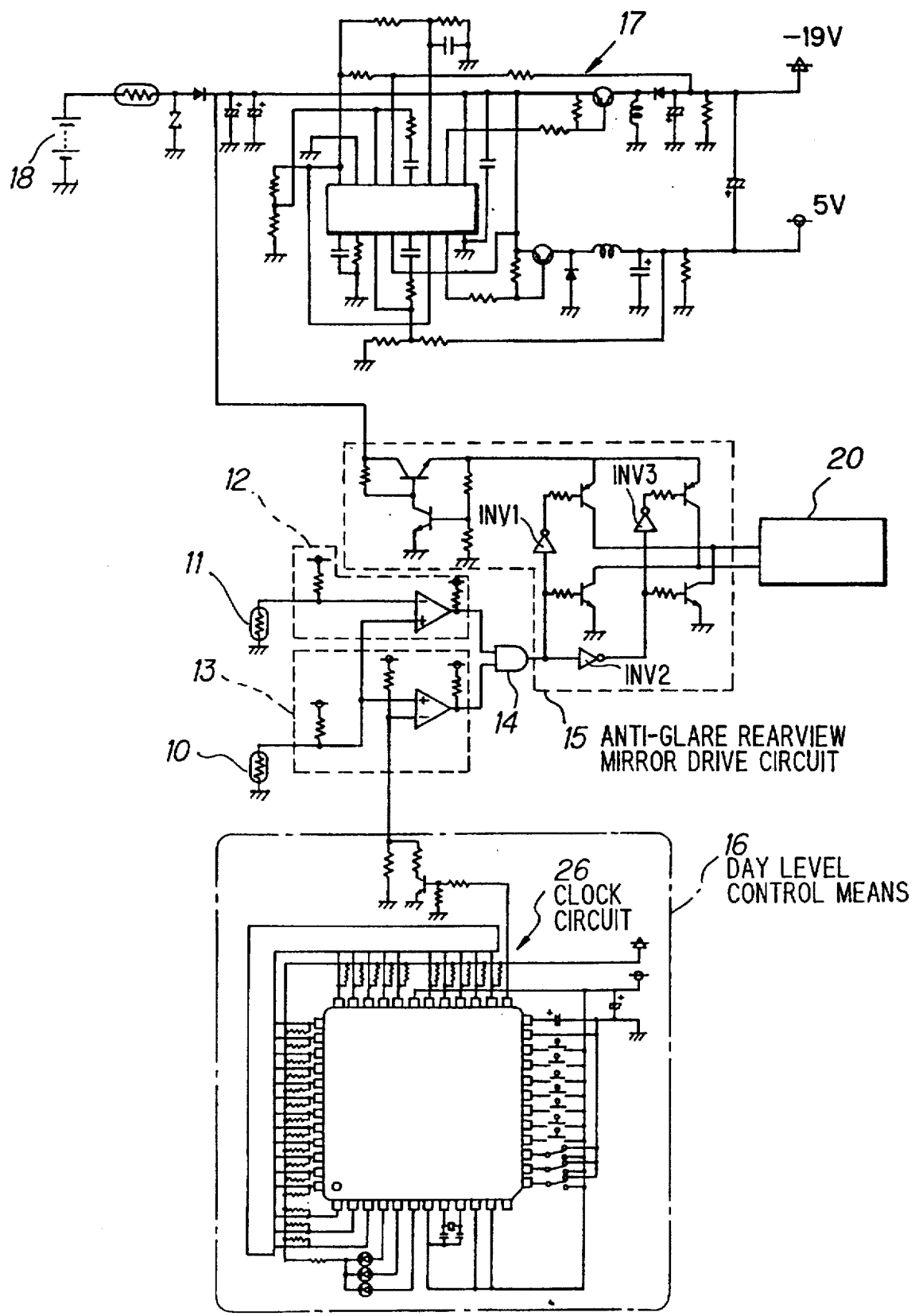
FIG. 3 is an electronic circuit diagram of the embodiment of the anti-glare rearview mirror according to the present invention.
Figure 14:
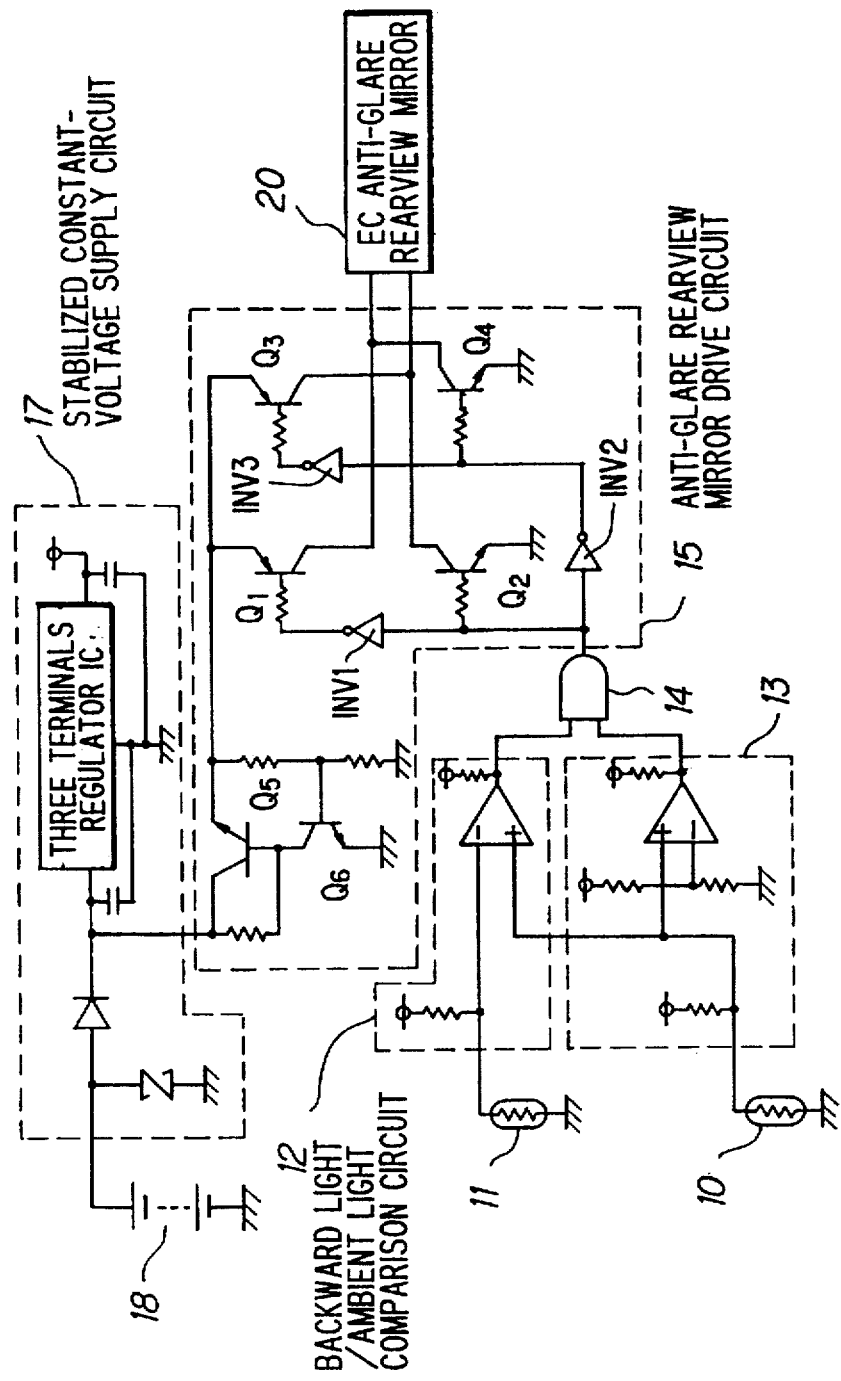
FIG. 14 is an electronic circuit diagram illustrating embodiments of a drive circuit and a backward and an ambient light level comparison circuit of an conventional anti-glare rearview mirror.
Figure 15:
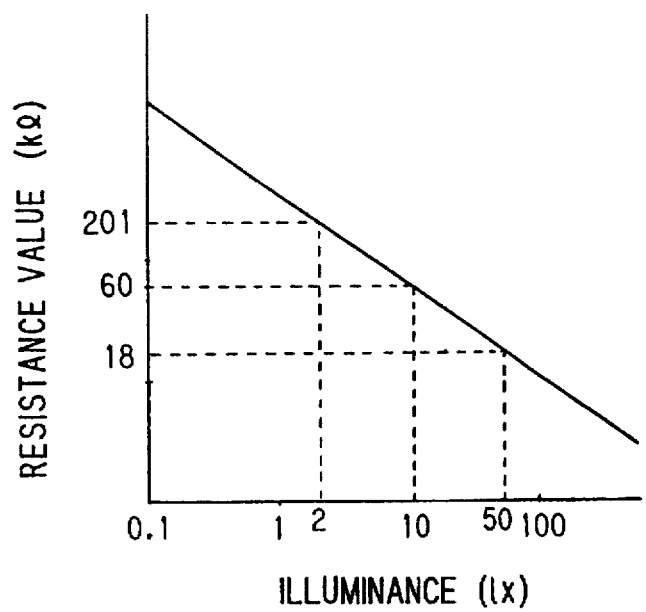
FIG. 15 is a diagram illustrating an illuminance-resistance value characteristic of a typical Cds device used for the conventional automatic anti-glare rearview mirror.
Figure 16:
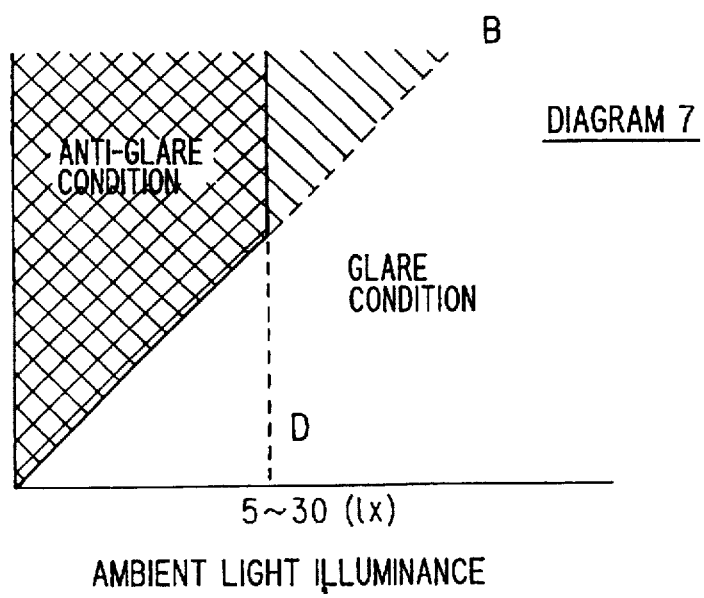
FIG. 16 is a diagram illustrating a sensitive characteristic (anti-glare mode characteristic) of the rearview mirror by a relation of the ambient light illuminance (level) and the backward light illuminance (level) of the system of FIG. 15.

Further detailed embodiment of the present invention will be described in connection with the accompanying drawings. FIG. 3 illustrates a block diagram of an embodiment of the anti-glare rearview mirror of the first invention, in which the central part thereof is approximately equal to FIG. 14, and the system is composed of the backward light level sensing device (11) (sensor), the ambient light level sensing device (10) (sensor), the backward and ambient light level comparative circuit (12), AND circuit (14), the enforced DAY generation circuit (13), the anti-glare rearview mirror drive circuit(15) and EC anti-glare rearview mirror (20).

In the embodiment, the output of a clock circuit (26) is connected to the enforced DAY generation circuit (13) to perform an enforced DAY level control means (16A). A partial potential resistance divides the supply voltage an intermediary point of said resistance is connected to a standard input terminal of the comparator for setting the ambient light level (an actuation point) to operate the enforced DAY function, and one of resistance values of said partial potential resistance is set to vary depending on an output of indicating a determined term of the clock circuit (for example, a certain time zone or a certain term of the year). In the embodiment, the potential resistance value is changed by a resistance of a fixed resistance and a transistor which is connected in parallel therewith to be conducted by a timer output. A power source circuit is also indicated in FIG. 3 for a reference.

Figure 5A:
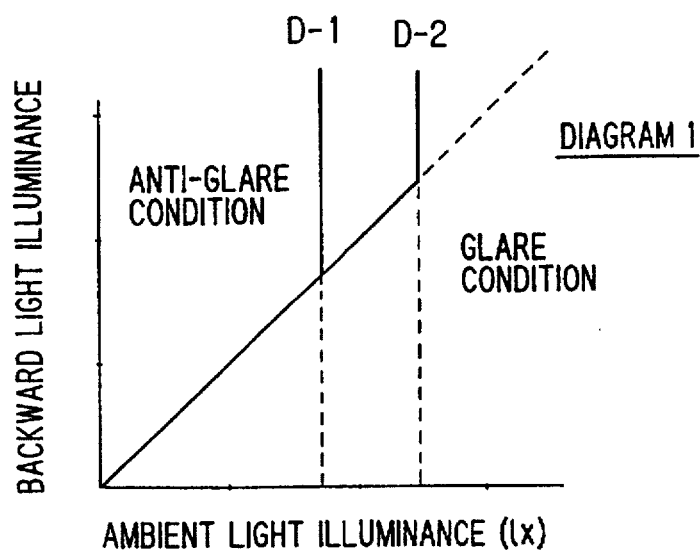
FIG. 5A is a diagram indicating an actuation characteristic of an enforced DAY function of FIG. 3.

As described hereinbefore, the system of the embodiment contains a clock circuit (26) to change the ambient light level of the enforced DAY in accordance with a time. A timer function of the clock circuit is utilized to set the enforced DAY operation level which changes every day and night time, a timer is set ON at PM 6:00 and set OFF at AM 6:00. For example, the ambient light level of the enforced DAY during a gray time PM 6:00 to AM 6:00 is set on a line of D-2 of a diagram of FIG. 5A, while the level during a bright time AM 6:00 to PM 6:00 is set on a line of D-1. The rearview mirror system is set as described above to become the anti-glare mode at the comparative bright place such as the shopping arcade and the backward being glare in the night time during AM 6:00 to PM 6:00, and to overcome the disadvantage of becoming the anti-glare mode at the comparative dark place such as the tree shade in a day time and the backward being bright during AM 6:00 to PM 6:00.

In a system which the clock circuit (26) having a calender function, it is possible to set it in consideration of a season, for example, a timer is set ON at PM 7:00 and is set OFF at AM 5:00 in a summer season. In a winter season, the timer is set ON at PM 5:00 and is set OFF at AM 7:00 so that the starting level of the enforced DAY function is up to adjust with the actual night time, and it is more preferable to adjust the system operation with an actual using condition.

Figure 4:
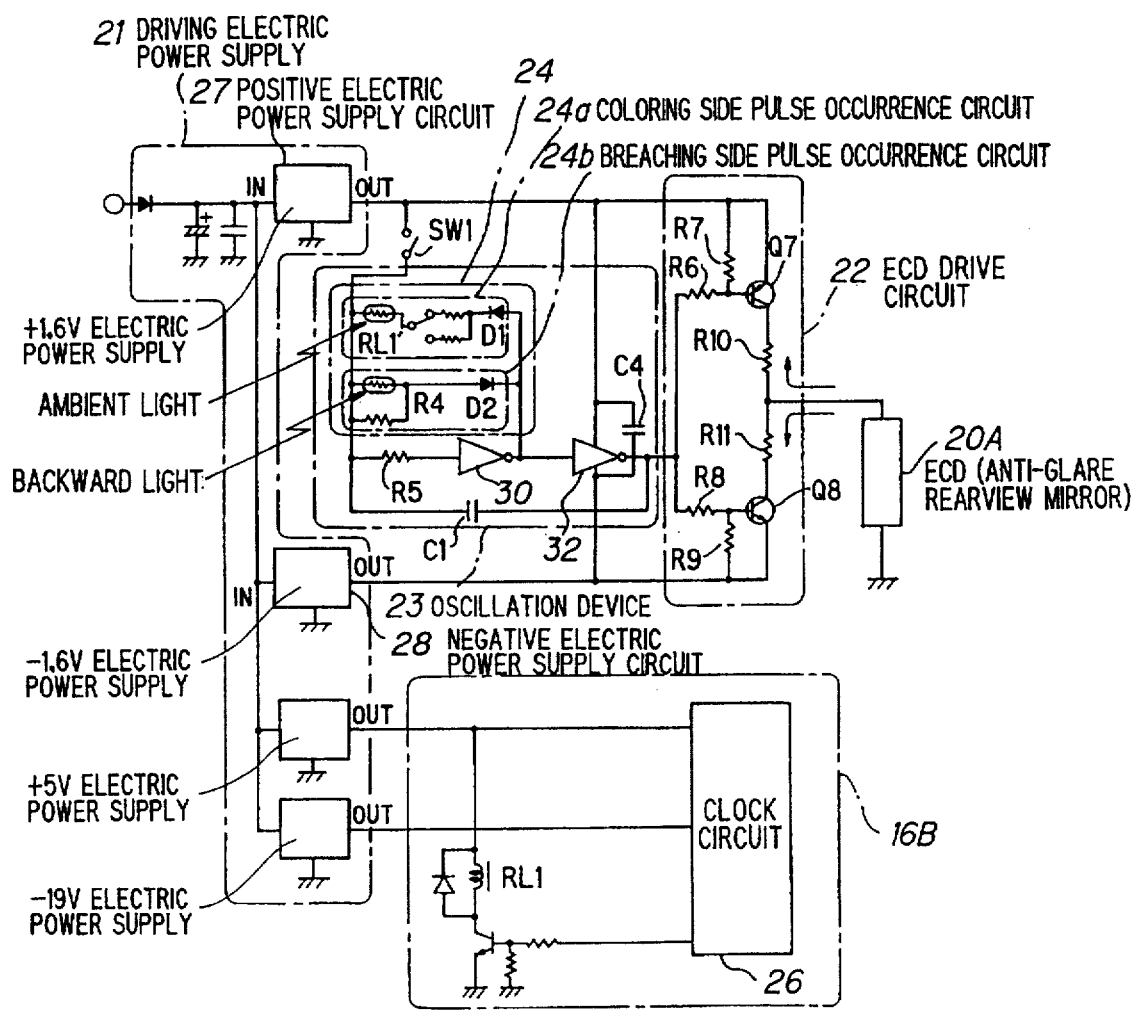
FIG. 4 is an electronic circuit diagram of the other modified embodiment of FIG. 3 according to the present invention.

FIG. 4 illustrates a block diagram of another embodiment according to the circuit diagram of FIG. 17 and the clock circuit (26) is simplified. The enforced DAY level control means (16B) also composed of the clock circuit (26) is connected in said circuit to change the enforced DAY operation level, in which the output of the clock circuit (26) drives a relay (RL1) so that said relay contact (RL1') is connected to a feedback resistance of a pulse generator (16a) of a coloring side and the feedback resistance value (that is a duration time of the pulse) is changed due to an excitation of the relay (RL1) so as to equivalently change the enforced DAY function starting point. FIG. 4 illustrates an embodiment of an EC anti-glare rearview mirror drive device as shown by FIG. 2, in which "L" level is set to be one of oscillation signals generated by the oscillation device 23, "H" level is set to be the another, and one level for driving the mirror in the coloring direction and the other level for driving it in the bleaching direction are illustrated. In the driving power source 21, +12 V direct current is input from the battery to be converted to approx. +1.6 V direct voltage by the positive power circuit 27 and to be converted to approx. −1.6 V direct voltage by the negative power source circuit 28. These positive and negative power source circuits 27, 28 are efficiently composed of a switching power source without providing special spaces for containing it in the mirror housing and further with less heating.

In FIG. 4, a reverse cycle control circuit 24 is provided in a feedback loop of the oscillation device 23 and the ambient light level sensing device and the backward light level sensing device are provided in the reverse cycle control circuit 24. In the oscillation device 23, the resistance R5, two inverters 30, 32 are connected with each other in series and inverters 30, 32 and capacitor C1 are connected with each other in parallel. Capacitor C1 is charged in a time constant and the output of inverters 30, 32 is reversed when the voltage thereof is over the threshold level of the inverter 30, and the oscillation is performed by repeating said actuation. The oscillation cycle t is obtained by formula t=2.2 R0 . C1 and the duty ratio t1:t2 of the oscillation signal becomes approx. 1:1 in case that inverters 30, 32 are composed of CMOS IC.

Figure 5B:
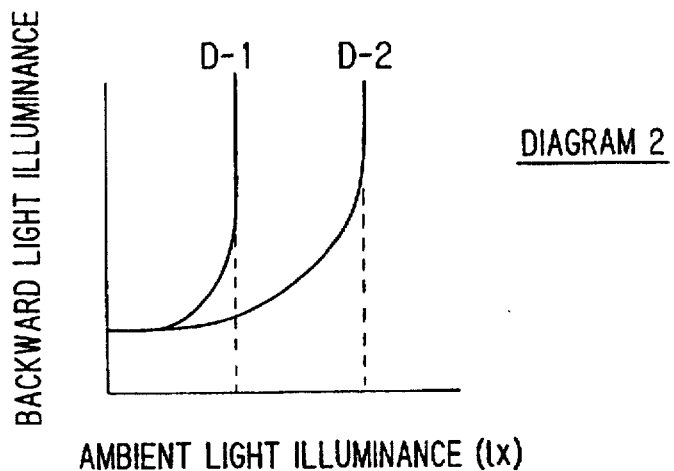
FIG. 5B is a diagram illustrating an actuation characteristic of an enforced DAY function of FIG. 4.

In FIG. 4, the reverse cycle control circuit 24 of the oscillation device 23 is composed of a coloring side pulse generator 24a and a bleaching side pulse generator 24b. The coloring side pulse generator 24a is composed of CdS to comprise the ambient light level sensing device and the resistance and diode D1 connected to the relay contact RL1' in series. The bleaching side pulse generator 24b is composed of Cds to comprise the backward light level sensing device, diode D2 connected to said DdS in series and the resistance R4 connected to said CdS in parallel. The change of the enforced DAY level of the embodied system is shown by a diagram 2 of FIG. 5B. It is also possible to overcome the disadvantage at the gray time described above by changing the ambient light level of the enforced DAY to D-2 at the night time and by changing it to D-1 at the day time.

In the embodiments illustrated in FIG. 3 and FIG. 4, the system is composed of an anti-glare rearview mirror for an automobile which is capable of an extinction of a reflection light, a rearview mirror drive circuit for making the mirror to be anti-glare mode, a backward light and an ambient light level comparison circuit to automatically operate said rearview mirror under a certain mode in accordance with an output of both a backward light level measuring sensor and a ambient light level measuring sensor, and an enforced DAY circuit to operate an anti-glare mode of said backward and ambient light level comparison circuit according to the ambient light level, especially further composed of a clock circuit and an enforced DAY level control means to change an operation starting level of said enforced DAY circuit to a determined value on a date and/or during the time determined by an output of said clock circuit.

In the embodiment of described above, the output of the clock circuit is reflected on the enforced DAY level setting to fit the operation of the automatic anti-glare rearview mirror with an actual environment, while there is an available case of changing the enforced DAY level by an output from an external equipment. It is preferable for an actual condition that said enforced DAY circuit operation level can be changed according to a light switch ON of the automobile. Therefore the switching ON/OFF of the light may be set an information from the external equipment so that the light ON switch is provided as the enforced DAY level control means (16) to set the ambient light level of the enforced DAY on a line of D-2 as illustrated by a diagram 1 (diagram 2) of FIG. 5A and FIG. 5B at the time of the light being ON (the night time ), while to set it on a line D-1 at the time of the light being OFF. Further instead of the clock circuit output in the embodiment illustrated by FIG. 3 and FIG. 4, it is simply possible to compose the circuit for inputting a signal from a terminal which conducts an electricity at the time of the light switch ON, and those are not shown in the drawing to overcome the overlapping.

The system is composed as described above, and normally the driver switches the light ON during a night time at the comparative bright place as a shopping arcade or the like so that the enforced DAY level is set to be up and the rearview mirror operates in becomes the anti-glare mode adequately to protect the driver from a backward glare light.

It may be possible to set the information of the external equipment to correspond with ON/OFF of a back gear. When the automobile is running back and the backward is bright more or less, it is easy for the driver to confirm the backward by the normal mode of the rearview mirror with the ambient light level down. Further in respect to the operation of the mirror in case of the above, the starting level of the enforced DAY function is changed while an automatically anti-glare mode system is kept. It is different from the conventional art that the operation provides cooperating with the back gear to prohibit the anti-glare action of the rearview mirror as described hereinbefore.

The embodiment of the present invention which is described above is based on a technical idea to automatically change the enforced DAY level according to the information from the external equipment. While an adequate level of the enforced DAY function can not be determined due to an individual difference and for an actual practice, it often happens that the mirror is not operated properly by a fixed enforced DAY level setting. Further the adequate enforced DAY level becomes different in accordance with a running environment.

Figure 6:
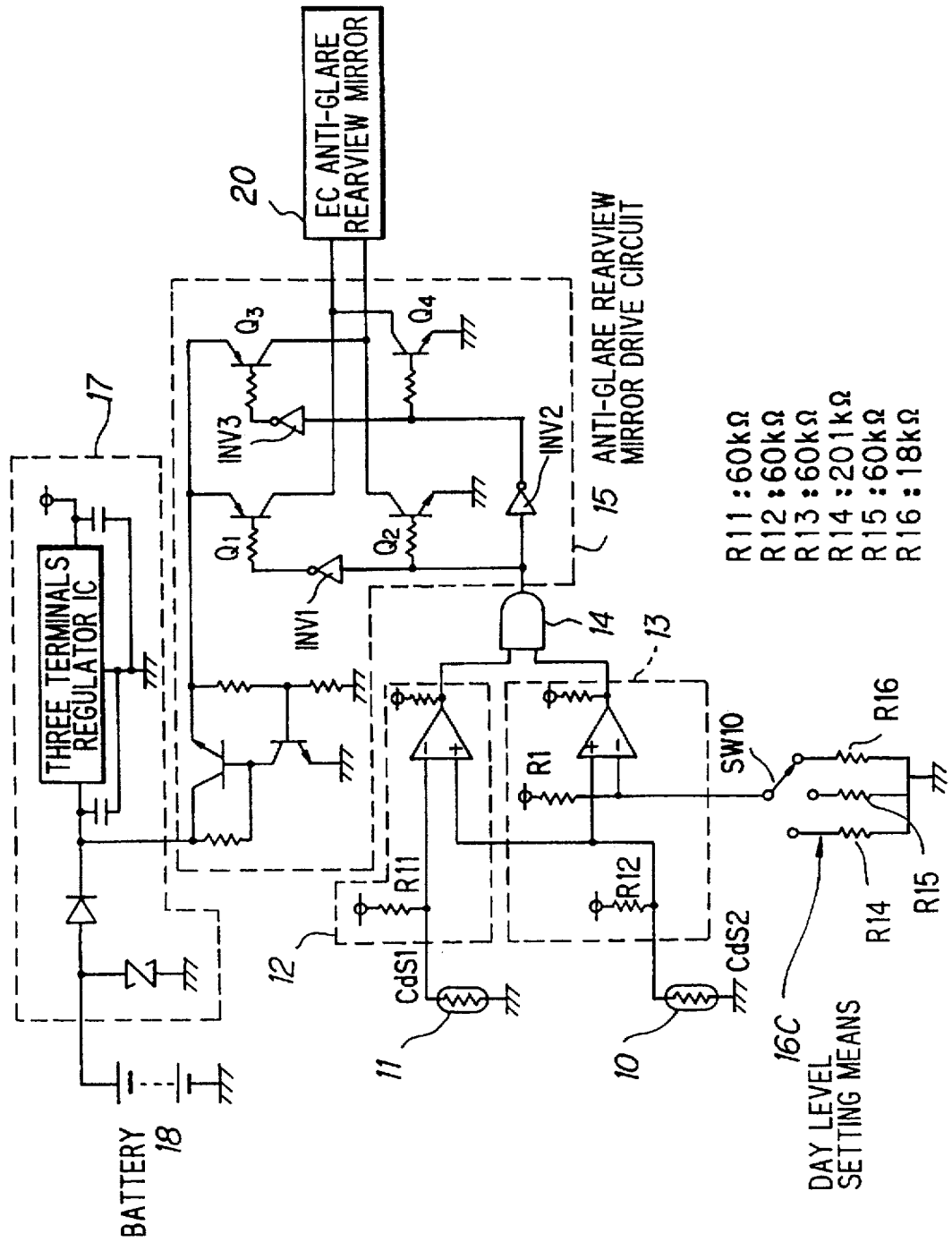
FIG. 6 is an electronic circuit diagram of a further embodiment according to the present invention.

Therefore the free action of the anti-glare rearview mirror may be achieved by setting the ambient light level (setting value) for operating the enforced DAY function to change depending on the driver's decision any time of necessity, and the system of said embodiment is illustrated by a block diagram of FIG. 6.

In the embodiment, the driver can change the ambient light level of the enforced DAY any time of necessity by a switch (SW1). The main parts relating to the anti-glare operation of the circuit of FIG. 6 are same as the one illustrated by FIG. 3. The partial potential resistance 3 to supply the standard voltage to the comparator of an enforced DAY generation circuit (13) is composed of three contacts switch (SW10) capable of switching each resistance (R14, R15, R16) so that the partial potential ratio is switched in three stages and changed to the according enforced DAY level. The driver operates the switch (SW10) which is disposed around the driver's seat to change a sensitivity characteristic of the enforced DAY. In the embodied system illustrated by FIG. 6 in which R11 to R16 are respectively set values as shown in FIG. 6, the enforced DAY level can be set in three stages as illustrated by a characteristic diagram 3 of FIG. 7.

In the embodiment described above, the automatic anti-glare rearview mirror can be used more comfortably by changing the setting thereof if necessary so that the ambient light level of the enforced DAY is set at the D-1 position, the rearview mirror is prevented from becoming the anti-glare mode in the day time at the comparative ambient dark places such as the tree shade or the like even if the backward is bright. When it is set at the D-3 position, the mirror operates in the anti-glare mode in the night time at the comparative ambient bright places such as the shopping arcade and the backward glare.

Figure 7:
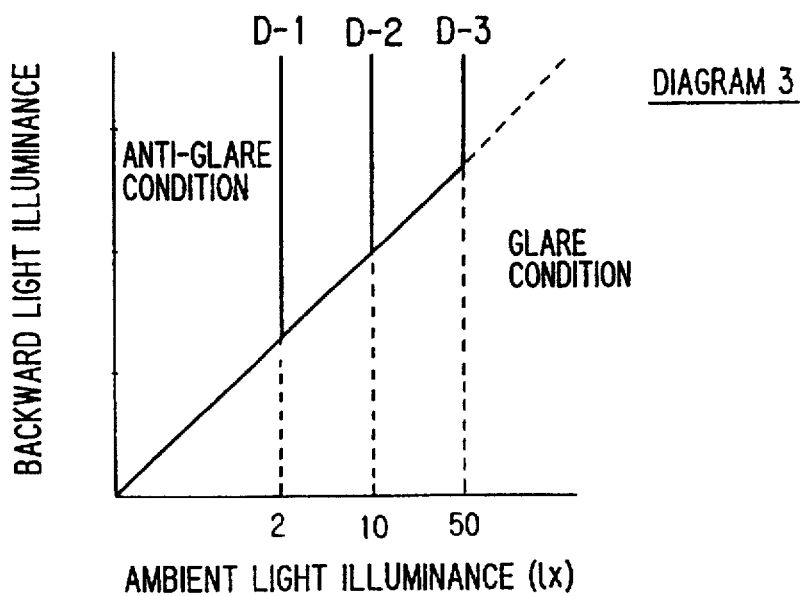
FIG. 7 is a diagram illustrating an actuation characteristic of the enforced DAY function of the embodiment of FIG. 6.
Figure 8:
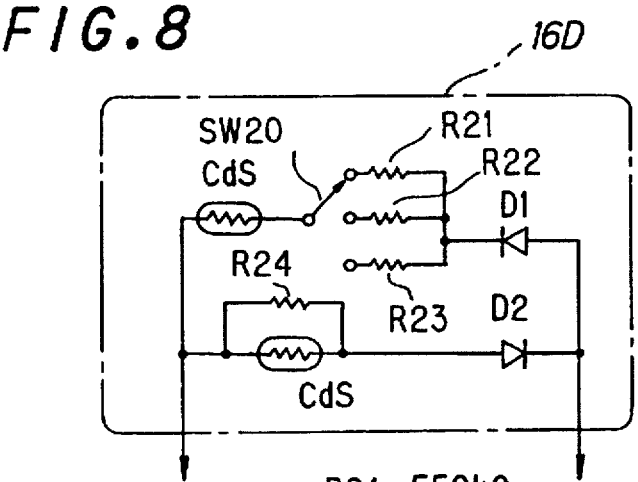
FIG. 8 a circuit diagram of a reverse cycle control circuit according to the present invention.
Figure 9:
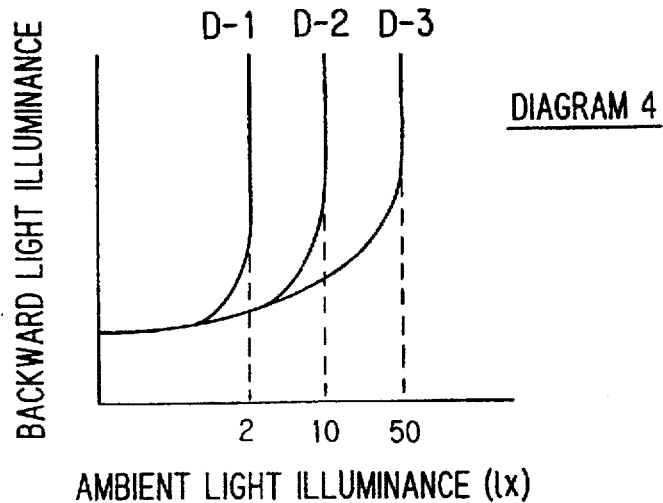
FIG. 9 is a diagram illustrating an actuation characteristic of the enforced DAY function of the system which the circuit of FIG. 8 is used.

Similarly, it is possible to compose a circuit provided with the switch according to the circuit illustrated by FIG. 4. It is not shown in detail, however the coloring side pulse generator of FIG. 4 can be replaced by an electrical network (16c: coloring side pulse generator) which includes a switch (SW20) illustrated by FIG. 8. Respective resistance (R21 to R24) values are set as illustrated in FIG. 7, and the setting as shown by a diagram 4 of FIG. 9. Of course the switch (SW20) is disposed around the driver's seat to switch the sensitivity characteristic of the enforced DAY and the driver can operate it if necessary.

Figure 11:
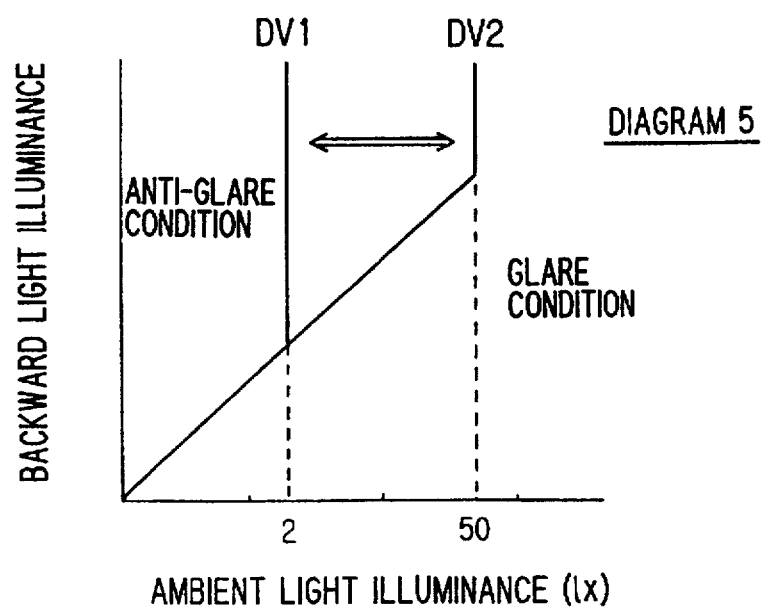
FIG. 11 is a diagram illustrating an actuation characteristic of the enforced DAY function of the system which the circuit of FIG. 10 is used.

In the embodiment described above, the enforced DAY level is changed to multiple stages by a switch and the driver can adjust the enforced DAY level continuously by a use of a variable resistor as illustrated by a block diagram of FIG. 10. A partial resistor is composed of a volume (VR3) and a resistance (R34) connecting in series with each other to perform as an enforced DAY level setting means (16D). An operation bottom of the volume (VR3) is disposed at the driver's seat at least. Respective volume and resistance (VR 3, R31 to R34) values are set as illustrated in FIG. 8A and a setting illustrated by a diagram 5 of FIG. 11 is obtained to set the enforced DAY level at an optional level between DV1 to DV2. It is preferable to use a rotation type or a slide type variable resistor (VR3). Further it is more preferable to use a resistor clicking at the variable position and the driver can set the level of the enforced DAY without checking the operation bottom.

As described above, the driver can change the ambient light level of the enforced DAY to multiple stages in accordance with his decision by using the volume.

Figure 12:
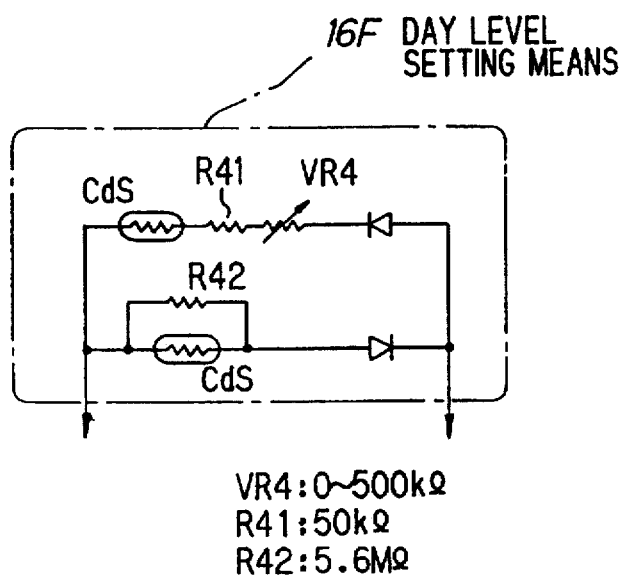
FIG. 12 is a partial circuit diagram illustrating a further modified embodiment according to the present invention.
Figure 13:
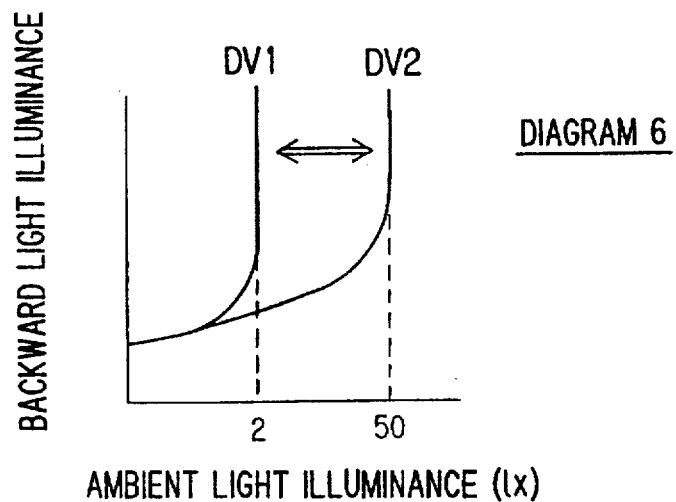
FIG. 13 is a diagram illustrating an actuation characteristic of the enforced DAY function of the system which the circuit of FIG. 12 is used.

Further it is possible to provide the volume in the embodiment illustrated by FIG. 4 so that the coloring side pulse generation part is replaced with the electrical network (16C: coloring side pulse generator) including a volume (VR4) as illustrated by FIG. 12 (whole system is not shown). The operation bottom of the volume (VR4) is disposed at the driver's seat. Respective resistance (VR4, R41, R42) value are set as illustrated in FIG. 12 and the setting is obtained as illustrated by a diagram 6 of FIG. 13. The enforced DAY level can be set to an optional level between DV1 to DV2 to enable the driver to continuously change the ambient light level of the enforced DAY to multiple stages if necessary.

In the third embodiment of the present invention as described above, the system is composed of a rearview mirror for an automobile capable of adjusting the extinction of a reflected light, a circuit for driving the rearview mirror in an anti-glare mode, a backward light and an ambient light comparison circuit for automatically operating the rearview mirror under the certain mode based on, outputs of both backward light level detecting sensor and ambient light level detecting sensor, and an enforced DAY circuit for controlling the anti-glare node of said backward light and ambient light level comparison circuit in accordance with the ambient light level. Further it is characterized in that an enforced DAY level setting means is provided in the system to change the operation level of said enforced DAY circuit. Moreover, it is more useful to compose said enforced DAY level setting means so that the operation starting level of said enforced DAY circuit can be changed any time or continuously by a switch to be operated by the driver any time or by a variable controller to be operated by the driver.

In the embodiment described above, an electrochromic rearview mirror is principally used in the system and it may be possible to use other prism type of the crystal type anti-glare mirror and adequate drive circuits will be respectively adapted. Resultantly the system may be an automatic anti-glare rearview mirror having an enforced DAY function, and the adequate anti-glare mode is achieved to be more useful by adapting each embodiment of the present inventions. Further each embodiment of the present invention may be applied double in the system that the enforced DAY level can be operated by the clock circuit and simultaneously the volume can be provided at the driver's seat enabling to set the enforced DAY level by the driver so as to function with each other.

In the system of the present invention, the enforced DAY level control means is provided to change the operation starting level of said enforced DAY circuit on a date and/or during the time to be determined by the clock circuit and the output of said clock circuit, or the enforced DAY level setting means is provided to change the operation level of said enforced DAY circuit according with the light switch ON of the car of itself, and the hight quality automatic anti-glare rearview mirror can be achieved and a needless operation of the system for a low ambient light level is improved, that has not been achieved by the conventional system.

In the system, the enforced DAY level setting means is provided to operate and change the operation level of said enforced DAY circuit at any time, especially said enforced DAY level setting means is provided as the switch. Said enforced DAY level setting means is formed to be the variable controller which can be operated by the automobile driver so that during the automobile running, the driver can control the operation of the automatic anti-glare rearview mirror to increase the danger preventing effect by adjusting the adequate enforced DAY level at any time and the enforced DAY level may be set individually to use the system more comfortably.

It will be understood that each of the elements described above, or two or more together, may also find a useful application in other types of constructions differing from the types described above.

While the invention has been illustrated and described as embodied in an automatic anti-glare rearview mirror system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. An automatic anti-glare rearview mirror system, comprising an anti-glare rearview mirror with a variable reflectivity; a reflectivity varying device for varying the reflectivity of said anti-glare rearview mirror; a driving power source; an automobile backward light level sensing device; an automobile ambient light level sensing device; an enforced generation circuit for operating an anti-glare mode of said rearview mirror according to an ambient light level sensed by said automobile ambient light level sensing device; an enforced level control means for changing an operation starting level of said enforced generation circuit to a determined value; an oscillation device for repeating an oscillation signal of a first level in which said rearview mirror is in an anti-glare mode and a second level in which said rearview mirror is in a normal mode alternately and for controlling duration times of said signal of said first level and said second level separately; a reverse cycle control circuit for varying and controlling a duration of time of one of the levels of the oscillation signal generated by said oscillation device according to a light level sensed by said ambient light level sensing device and for varying and controlling a duration time of the other of the levels of said oscillation signal according to a light level sensed by said backward light level sensing device; and a drive circuit for reversing a polarity of a driving voltage supplied from said driving power source and applying the voltage to said reflectivity varying device according to said first level or said second level of said oscillation signal generated by said oscillation device, said drive circuit being formed to drive said reflectivity varying device in a coloring direction at one of the oscillation signal levels, and to drive said reflectivity varying device in a bleaching direction at the other signal level so that said reverse cycle control circuit operates to hold short or hold long a duration of time of one of the levels according to a greater ambient light level than the backward light level or according to a lesser ambient light level than the backward light level respectively, while said reverse circuit control circuit operates to hold short or hold long a duration time of the other level according to a greater backward light level than the ambient light level or according to a lesser backward light level than the ambient light level respectively, said drive circuit being formed to drive said reflectivity varying device in a bleaching direction at one of the oscillation signal levels and to drive said reflectivity varying device in a coloring direction at the other signal level so that said reverse cycle control circuit operates to hold long or to hold short a duration of time of one of the levels according to a greater ambient light level than the backward light level or according to a lesser ambient light level than the backward light level respectively, while said reverse cycle control circuit operates to hold long or to hold short a duration time of the other signal level according to a greater backward light level than the ambient light level or according to a lesser backward light level than the ambient light level, respectively.

2. An automatic anti-glare rearview mirror system as defined in claim 1, wherein said enforced level control means is a clock circuit for changing the operation starting level of said enforced generation circuit to a determined value by an output on a certain date.

3. An automatic anti-glare rearview mirror system as defined in claim 1, wherein said enforced level control means is a clock circuit for changing the operation starting level of said enforced generation circuit to a determined value during a certain time.

4. An automatic anti-glare rearview mirror system as defined in claim 1, wherein said enforced level control means is formed so as to automatically vary the operation starting level of said enforced generation circuit to a determined value by an output from an external equipment.

5. An automatic anti-glare rearview mirror system as defined in claim 4, wherein said enforced level control means automatically vary the operation starting level of said enforced generation circuit by the output from the external equipment formed as a light switch ON.

6. An automatic anti-glare rearview mirror system as defined in claim 1, wherein said enforced level setting means includes switches operated by a driver formed so that the operation starting level of said enforced generation circuit is settable at any time by said switches operated by a driver.

7. An automatic anti-glare rearview mirror system as defined in claim 1, wherein said enforced level setting means includes variable controllers operated by a driver formed so that an operation starting level of said enforced generation circuit is continuously adjustable at any time by said variable controllers operated by a driver.

8. An automatic anti-glare rearview mirror system as defined in claim 1, wherein said enforced level control means includes at least two elements which are external equipment.

9. An automatic anti-glare rearview mirror system as defined in claim 8, wherein said two elements include a clock circuit and a light switch ON.

10. An automatic anti-glare rearview mirror system as defined in claim 1, wherein said two elements include a switch and a variable controller operated by a driver.

11. An automatic anti-glare rearview mirror system as defined in claim 1, wherein said reverse cycle control circuit includes first and second reverse cycle control circuits, said first reverse cycle control circuit being provided with a first photo-conductive cell with a resistance value reduced according to an ambient light level received from said automobile ambient light level sensing device, a first resistor and a first diode connected in series with said photo-conductive cell and a second resistor connected in parallel with said first photo-conductive cell, said second reverse cycle control circuit being provided with a second photo-conductive cell with a resistance value reduced according to an ambient light level determined by said automobile ambient light level sensing means, a third resistor connected in series with said second photo-conductive cell, a second diode in a reverse direction of said first diode, and a fourth resistor connected in parallel with said second photo-conductive cell, said oscillation device being formed so that said first and second reverse cycle control circuits being connected in parallel with each other on a feedback trace and a duration time of one of the oscillation signal levels is shorted when a resistance value of said first photo-conductive cell becomes low, while a duration time of the other oscillation signal level is shortened when the resistance value of said second photo-conductive cell becomes low.

* * * * *